Jan. 14, 1941. E. L. FRISBIE 2,228,513
COMBINED SINKER AND SPRING ATTACHING DEVICE
Filed Feb. 10, 1939

Inventor,
E. L. Frisbie.

By Sterling P. Buck,
Attorney.

Patented Jan. 14, 1941

2,228,513

UNITED STATES PATENT OFFICE 2,228,513

COMBINED SINKER AND SPRING ATTACHING DEVICE

Edgar L. Frisbie, Baltimore, Md.

Application February 10, 1939, Serial No. 255,591

4 Claims. (Cl. 43—42)

This invention relates to fishing tackle, and specifically, to a combined sinker and spring attaching device.

When fishing with hook-and-line tackle, the fishermen encounter various water conditions including slow, moderate and swift currents; also relative currents such as the fisherman encounters when trolling; also various depths to which it is desired to sink the bait or lure; and to compensate for these various conditions, it often becomes necessary to increase and (alternately) decrease the weight of the sinker by putting on or taking off a section of the sinker. In previously known devices for this purpose, certain disadvantages have been encountered, including the amount of time required to make the change, the insecurity of the attachment of the added sinker-section, and the tendency of such sinkers to become engaged with water-weeds and other subaqueous obstructions. It also becomes necessary to frequently interchange fishing lures or baits, and of course, it is desirable to make such changes quickly and securely.

Therefore, one object of this invention is to provide a very convenient, time-saving, loss-preventing spring-element that includes a line-attaching loop, a sinker-section or part of a sinker-section, and two oppositely disposed spring-pressed hooks that cooperate to hold another sinker-section in engagement therewith or to hold a fish-lure in engagement therewith, and which other sinker-section or fish-lure can be very quickly and easily disengaged by subjecting it to a push, half-turn and a pull which forces it against the spring-pressure that normally holds the interlapped hooks substantially against one another or vary slightly spaced from one another.

Another object is to so combine said spring element with a molded sinker element as to confine and embrace the intermediate part of the spring element and thereby increase the yielding resistance of the interlapped hooks against being forced apart, thus amplifying the security of the engagement of these interlapped hooks with the added sinker-section or with the attached lure.

Another object is to form each molded sinker-element with a cavity in the middle part of which the interlapped hooks are disposed in the proper position for permitting the line-attaching loop or eye of an added sinker-section or lure to be pushed inward far enough to be disengaged from the hooks preparatory to turning the added sinker-section to a position from which it can be pulled outward between the spring elements that include the interlapped hooks; also which cavity normally encloses the greater part or all of the eye that is engaged with the interlapped hooks.

Another object is to imbed a part of the line-attaching loop or eye within the molded sinker-element so as to securely anchor the spring-element in a fixed relation to the molded element.

Another object is to provide a device of this kind which is of exceedingly simple construction and of the minimum number of originally separate elements, so the cost of manufacture is minimized.

Other objects and important features are pointed out or implied in the following detailed description, in connection with the accompanying drawing in which.

Figure 4:
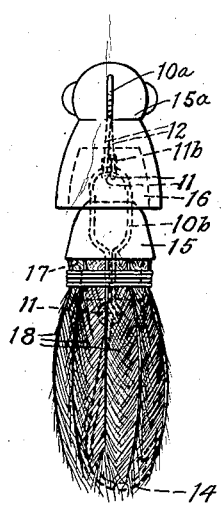
Figures 3, 5:
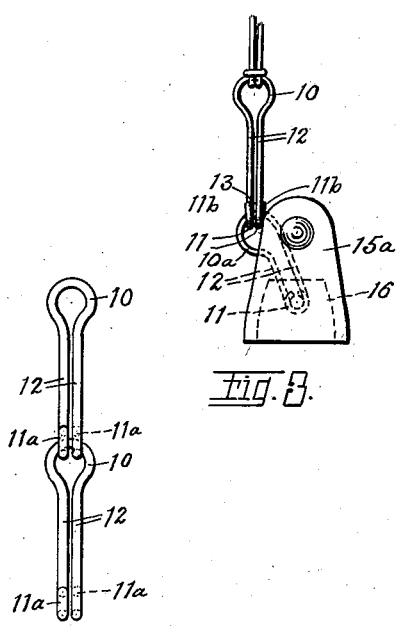
Fig. 3 is a side elevation showing a modified form of the sinker-unit engaged with a spring-element or unit such as shown in Figs. 1 and 2, but free from the molded element such as shown in Figs. 1 and 2, a portion of a fish-line or snood being engaged with the eye of the spring element whose interlapped hooks are engaged with the eye of the partly embedded spring element.

Fig. 4 is a view in elevation showing the lower unit of the device of Fig. 3 at right angles to the position of Fig. 3 and engaged with a fish-lure and fish-hook which latter is engaged with an attaching spring-element that includes the oppositely disposed interlapped hooks at one end and an eye at its other end partly imbedded in the molded element on which the other parts of the lure are secured.

Figure 1:
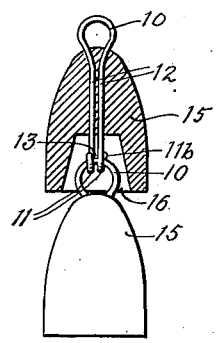
Fig. 1 is a view showing one of the sinker-sections or units in longitudinal central section in the plane of the attaching eye, and an attached sinker-unit in side elevation.
Figure 2:
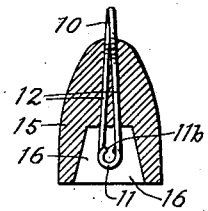
Fig. 2 is a sectional view of the upper part or unit of Fig. 1, but the section being at right angles to that of Fig. 1; the spring-element being in side elevation in both of these views.

Fig. 5 is a side elevation of two interconnected spring-units that are formed of heavy and stiff spring wire so that they constitute sinker-sections irrespective of parts molded thereon, the general construction of these being very slightly different from the spring elements shown in Figs. 1 and 2.

Referring to the drawing in detail, in which, similar reference numerals refer to similar parts in the several views, the invention is described in detail as follows:

The spring element consists of a length of spring-wire bent at its middle part to form an eye 10 or 10a or 10b, according to the forms shown in the different figures of drawing; such spring-element also includes mutually transposed interlapped hooks 11 and 11a, that is, hooks having their inlets or openings oppositely disposed; and also includes an intermediate part that comprises the approximately or substantially parallel parts 12 which gradually merge into the loop or eye 10, 10a and 10b that is somewhat elongated. The foregoing term "inlets or openings" refers to the clear spaces between the free ends and shanks or parts 12 of the respective hooks. In Figs. 1 to 4, the hooks 11 are bent laterally from the space or joint between them, as shown at 11b for widening the space at 13 so as to receive the eye of an interengaged or attached spring element when the latter is to be pulled out of engagement with the interlapped spring-pressed hooks; and it will also be seen that these hooks are so nearly closed that their ends must be sprung away from one another, or away from the adjoining intermediate parts 12, by pressure of the attaching loop or eye thereagainst, when the loop or eye is being either engaged or disengaged therewith or therefrom; and this is very important for preventing accidental disengagement of the eye from the interlapped hooks. Moreover, these two interlapped hooks provide twice the strength of a single hook, at the same time presenting two contact-points for the interengaged eye 10, 10a or 10b, thus decreasing the tendency to bend or distort the eye (10b, for example) when a strong pull is exerted as by a large fish on the hook 14 (see Fig. 4).

The molded weight-elements 15, 15a and 15b are of lead or other appropriate material and are molded around the greater portion of the respective spring-elements, so that only a part of each eye is protruding, the remaining part being imbedded in the weight-element or sinker-element, thus securing these two elements in fixed relation to one another, the only relative movement being effected when the interlapped hooks are sprung by forcing an eye 10, 10a or 10b inward or outward between the interlapped hooks. Each sinker-element 15 and 15a is formed with a cavity 16 in which is disposed the hook-ends of the respective spring elements; that is, not only the hooks are enclosed centrally within the respective cavities 16, but also the short adjoining parts of the parallel elements 12; and as the remaining parts of the elements 12 are snugly fitted in the molded sinker-element, the spring action is confined to the hooks and the adjoining short parts of the elements 12; so the operation of engaging and disengaging is similar to that of the well known "snap fasteners" where the relative movement of the parts is very slight, but where the resultant security is of a high degree, while the operation of attaching and detaching is simple and convenient. Such operation, referring now to Fig. 1, is as follows:

Holding the upper unit of Fig. 1 in one hand, the lower unit is grasped by the other hand and pushed inward of the cavity 16 until the eye 10 is out of the hooks 11—11b; second, the lower unit is rotated clockwise through about 90 degrees; and third, the lower unit is pulled outward of the cavity 16 so that the inner part of the eye 10 (of the lower unit) is forced between the hooks and then out from between them; and obviously, when desired to effect the engagement of an eye 10, 10a or 10b with the interlapped hooks, the just-explained operation is reversed; so an interchange of sinker-units and/or of fish-lures is effected conveniently, quickly and securely by the user.

Where it is desirable to add only a comparatively light sinker-section, one or more of the spring-elements such as shown in Fig. 5 may be engaged either with the eye (as in Fig. 3) or with the interlapped hooks (as in Fig. 5). In this form of Fig. 5, the hooks need not be bent laterally as at 11b, for the spring elements 12 are not confined, so the spring action extends throughout the length of each of these units.

Each spring-unit has its eye 10 in a different plane from that plane which is between the hooks 11 and 11a; or, in other words, as shown in Fig. 5, each hook 11a is in a plane at right angles to the plane in which the loops 10 lie; and by this construction, all the loops 10 are in the same plane when interengaged with the hooks of adjoining spring-units; so that there is a mutuality of position of all the spring-units so interengaged, this mutuality and uniformity being of importance in simplifying the operation of linking these spring-units together.

In Fig. 4, the unit or element 15b is formed with a boss or diametrally reduced portion 17 around which is grouped a number of feathers or other flexible material that encloses the hook 14 and the attaching hooks 11 within a cavity formed within the surrounding lure-material 18 of feathers or fibers; and the hook 14 can be attached and detached in the manner described, after first separating the feathers or fibers 18 so as to gain access to the interlapped hooks. Therefore, the sinker-unit which comprises the parts 10b, 15b and 17 is similar to the ones shown in Figs. 1, 2 and 3, inasmuch as each of such units has a cavity in which the interlapped hooks are centrally disposed.

Though I have described these forms of my invention specifically, I have no intention to limit my invention to these specific details, for the invention is susceptible of numerous changes within the scope of the inventive ideas as implied and claimed.

What I claim as my invention is:

1. A fishing sinker-unit or element formed of a length of springy wire and comprising a loop at one end, two interlapped hooks at its opposite end, and two substantially parallel springy portions between the loops and the hooks, said loops being in a plane at an angle to the plane between the hooks, the openings or inlets of the hooks being oppositely disposed, substantially as described.

2. The structure defined by claim 1 in combination with a second sinker-element in which the greater part of the first said unit is encased while a portion of said loop protrudes from said second unit for attachment to a line or to the interlapped hooks of a similar wire element, said second sinker-element having a cavity in which the first said interlapped hooks are centrally disposed in a convenient relation for being sprung apart for permitting an eye or loop of a second wire-element to be forced between and into the interlapped hooks in the manner specified.

3. The structure defined by claim 1 in combination with a second sinker-element secured to and embracing the greater part of said element of springy wire in such manner as to hold it in fixed relation to the second sinker-element, said second sinker-element having a cavity in which the interlapped hooks are centrally disposed in the proper relation for permitting the hooks to be sprung away from one another by pressure of a wire loop therebetween and to permit said wire-loop to be moved into interengagement with said interlapped hooks.

4. The structure defined by claim 1, in combination with a second unit of the same kind having its loop normally interengaged with the oppositely disposed interlapped springy hooks of the first said unit, the said hooks being so nearly closed that the loop of the second said unit can be disengaged therefrom only by slightly springing said hooks wider open, for purposes specified.

EDGAR L. FRISBIE.